Nov. 28, 1961     S. H. GOLDMAN     3,010,569
PROTECTIVE CASE FOR MEDICAL THERMOMETER
Filed April 30. 1958     2 Sheets-Sheet 1
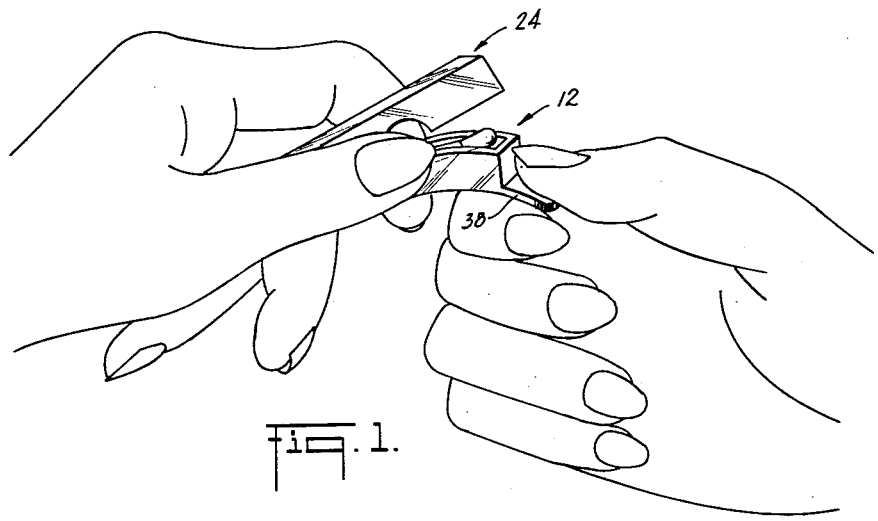
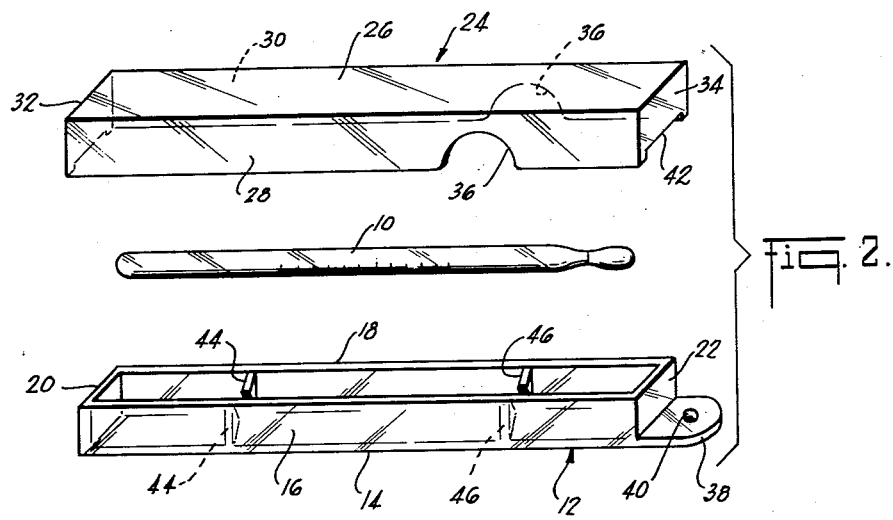
INVENTOR.
STANLEY H. GOLDMAN
BY
ATTORNEYS Nov. 28, 1961   S. H. GOLDMAN   3,010,569
PROTECTIVE CASE FOR MEDICAL THERMOMETER
Filed April 30, 1958   2 Sheets-Sheet 2
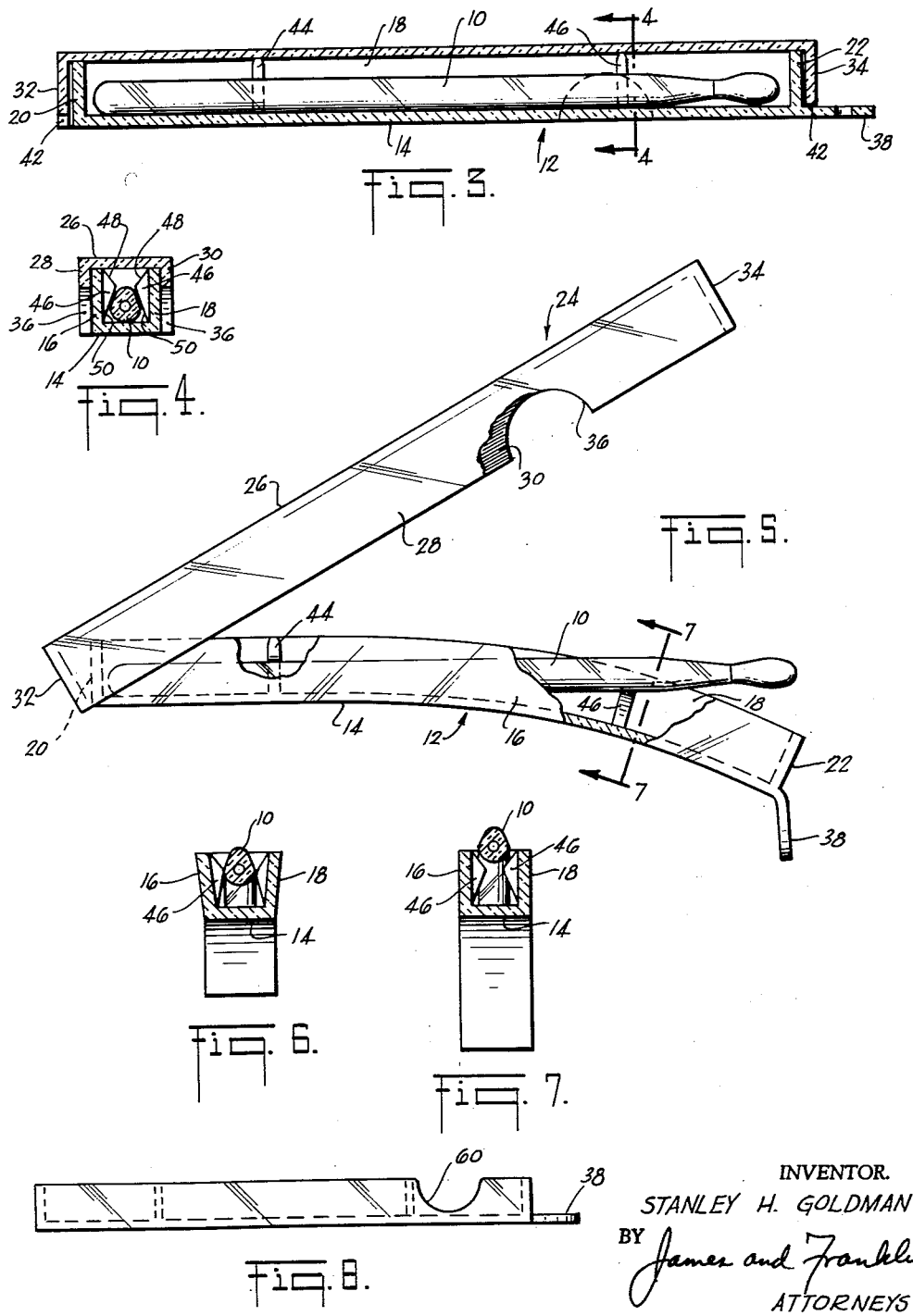
INVENTOR.
STANLEY H. GOLDMAN
BY James and Franklin
ATTORNEYS

United States Patent Office 3,010,569
Patented Nov. 28, 1961

3,010,569
PROTECTIVE CASE FOR MEDICAL THERMOMETER
Stanley H. Goldman, Wayne, N.J., assignor to Boonton Molding Company, Boonton, N.J., a corporation of New Jersey
Filed Apr. 30, 1958, Ser. No. 731,940
7 Claims. (Cl. 206—16.5)

This invention relates to protective cases, and more particularly to a protective case for a medical or clinical thermometer.

The primary object of the present invention is to provide an improved protective case for an elongated rigid article, such as a clinical thermometer. Heretofore, such thermometers have been housed in a rigid cylindrical case which opens or closes somewhat like a fountain pen. On dropping such a case, the thermometer is frequently broken, and sometimes the case itself is broken. One object of the present invention is to provide a protective case which better cradles and protects the thermometer, and which minimizes the possibility of breakage of either the thermometer or the case.

Another object is to provide a case consisting of two separable parts which remain closed without requiring special locking or detent means. Still another object is to provide such a case with tabs which tend to hold the thermometer in position in one half of the case, even when the other half has been removed.

Still another object is to facilitate release of the thermometer from the said holding tabs, and for this purpose one part of the case is made flexible and bendable, and the parts are so arranged that bending the case automatically releases the thermometer from the holding tabs. A further object is to provide means to facilitate opening of the case and simultaneous release of the thermometer.

Another object is to provide a protective case at least part of which is transparent, thereby showing on inspection whether the thermometer is inside the case. Still another object is to provide a protective case which is comparatively simple to manufacture and low in cost.

To accomplish the foregoing general objects, and other more specific objects which will hereinafter appear, my invention resides in the protective case elements, and their relation one to another, and to the article carried thereby, as are hereinafter more particularly described in the following specification. The specification is accompanied by drawings, in which FIG. 1 is a perspective view showing one way to both open the case and release the thermometer therefrom;

FIG. 2 shows the parts of the case in relation to a thermometer to be carried therein;

FIG. 3 is a longitudinal section through the case in closed condition with a thermometer therein;

FIG. 4 is a transverse section taken approximately in the plane of the line 4—4 of FIG. 3;

FIG. 5 is a side elevation showing the relation of the parts when the case is opened and the thermometer released;

FIGS. 6 and 7 are sections taken approximately in the plane of the line 7—7 and showing successive stages in the release of a thermometer from the case; and FIG. 8 shows a modification.

Referring to the drawing, and more particularly to FIG. 2, the protective case comprises a lower inner part 12, made of a soft flexible plastics material, and having a bottom wall 14, side walls 16, 18, and end walls 20, 22. This part of the case is open at the top. The case further comprises an upper outer part 24, which is also made of a plastics material, and which comprises a top wall 26, side walls 28, 30, and end walls 32, 34. These parts are so relatively dimensioned that the lower part is received frictionally in the upper part, and the case remains closed without special locking or detent means.

In that connection, it may be stated that the lower part is preferably made of a plastics material such as polyethylene or a vinyl resin such as polyvinyl chloride. The former is preferred. This material is relatively soft and frictional, and is dimensioned to readily fit in the upper part 24 and yet adhere to the same with a somewhat binding or frictional fit. This is true even if the upper part is not similarly made of a soft frictional plastics material.

In practice, I prefer to make the upper part of a harder and preferably transparent plastics material such as polystyrene which is preferred, or lucite, cellulose acetate, cellulose acetate butyrate, or methyl styrene. The use of a transparent material makes it possible to see at a glance whether the thermometer is in the case. The lower part 12 is translucent rather than transparent, and if desired, may be colored or made opaque, it being sufficient that the top is transparent.

The case is preferably provided with means to facilitate opening of the same. As here illustrated, the side walls 28, 30 of the upper part 24 are cut away, as indicated at 36, thus providing finger-grip access to the lower part 12. The lower part also has an ear 38 located as an extension of the bottom wall 14. If desired, this may be perforated, as indicated at 40, so that the thermometer case is readily hung on a nail or tied to a string. The end wall 34 is preferably cut away or shortened slightly, as indicated at 42, to clear the ear 38 when the case is closed. Preferably both end walls 32 and 34 are made alike, so that the cover can be applied either way. It will be evident that either the tab 38 or the finger passages 36 will facilitate opening the case, but the tab 38 has a further advantage which is described later.

The lower part 12 preferably has holding tabs 44 and 46 integrally molded on the inside. These are so shaped, preferably with a sloping and then undercut shape, as to receive and hold the thermometer with a snap fit. This will be clear from inspection of FIG. 4, in which it will be seen that the sloping surfaces 48 of tabs 46 facilitate pushing the thermometer into position, while the outward slope or undercut shape of the tabs at 50 helps hold the thermometer in position once it has been inserted. Thus, even when the case has been opened, and the upper part entirely removed from the lower part, the thermometer 10 is nevertheless safely held in the lower part. The lower part alone will cushion the thermometer and guard it against breakage in the event that the lower part is dropped. The pliable or rubber-like nature of the polyethylene material helps insure this desired result.

It will be understood that insertion or removal of the thermometer 10 is facilitated by an outward spread of the side walls 16 and 18. This is perhaps best shown in FIG. 6, which shows how the walls may spread apart as the thermometer is being inserted or removed. Of course, when the case is closed, this cannot happen, because the side walls are confined between the side walls 28, 30 of the upper part of the case.

The flexibility of the lower part 12 is of additional advantage in greatly facilitating release of the thermometer from the holding tabs. More specifically, the bottom may be bent in a direction away from its open face, as shown in FIG. 5. Inasmuch as the thermometer 10 is a rigid article, it does not bend and therefore snaps out of the holding tabs 46 to the released position shown in FIGS. 5 and 7. For this purpose, the part 12 may be seized by the ear 38, and as the case is bent, the thermometer first moves between the tabs, as shown in FIG. 6, and then suddenly pops or springs to a position above the tabs, as shown in FIG. 7. To complete the release of the thermometer, it is merely necessary to draw the same longitudinally from the remaining tabs 44, or to relatively move the thermometer and the lower part of the case to a greater angle which then releases the thermometer from the tabs 44, just as it was previously released from the tabs 46.

The case may be opened and the thermometer released in a single quick motion. This is illustrated in FIG. 1, in which the lower and upper parts 12 and 24 are being relatively opened angularly, with no attempt to separate the same at the opposite end. The opening movement is a bending movement of the lower part by seizure of the ear 38. Thus a single bending movement both opens the case and springs the thermometer from the holding tabs. The thermometer then readily withdrawn from the angularly disposed parts of the case, without fully separating the parts of the case. These are readily closed with one hand immediately after sliding the released thermometer out with the other hand.

It is not essential to release the thermometer by bending the lower part of the case, and a modified form of the lower part of the case is shown in FIG. 8, which differs in having the sides cut away, as indicated at 60. These may be located anywhere along the length of the case, but are preferably so located as to be out of registration with the thumb cuts 36 on the cover. They are preferably located near one end rather than in the center, because it is easier to release the thermometer from one pair of tabs at a time, rather than from both at once. In FIG. 8, they are shown located just outside one pair of tabs. They could be located outside the other pair of tabs, but the location shown has the advantage of providing better and more direct co-operation with the ear 38, which may be held with one hand while the thermometer is picked out with the other. Moreover, there is an advantage in facilitating the bending of the case at 60 when releasing the thermometer by the bending operation previously described.

It is believed that the construction and operation of my improved protective case, as well as the advantages thereof, will be apparent from the foregoing detailed description. The case cradles the thermometer against breakage, and actual drop tests have shown that the present case is greatly superior to the cylindrical or fountain pen type of rigid case heretofore used. The parts of the case hold together without special locking or detent means, because of the frictional fit therebetween. The thermometer is safely held in the lower part of the case even when the upper part has been removed. The preferably transparent upper part makes it possible to see whether the thermometer is in the case. The thermometer is readily released from the lower part by bending the latter, and if desired, the case is both opened and bent to release the thermometer in a single quick motion, without completely separating the parts of the case. The parts of the case are readily molded by standard molding techniques, and the case may be made at comparatively low cost.

It will be understood that while I have shown and described my invention in a preferred form, changes may be made in the structure shown without departing from the scope of the invention, as sought to be defined in the following claims.

I claim:

1. A protective case for a rigid elongated article, said case comprising an elongated trough-like lower inner part made of a soft flexible plastics material and having bottom, side, and end walls and being open at the top, and an upper, outer part comprising top, side, and end walls and being open at the bottom, said parts being so relatively dimensioned that the lower part is received frictionally in the upper part and remains closed without special locking or detent means, said lower part having an ear located as an extension of the bottom wall at one end, said lower part having holding tabs integrally molded on the inside and so shaped with an undercut shape as to receive the elongated article with a snap fit in order to hold the same in the lower part, the flexibility of the bottom part being such that it may be bent in a direction away from its open face in order thereby to release the article from the aforesaid holding tabs.

2. A protective case for a rigid elongated article, said case comprising an elongated trough-like lower inner part made of a soft flexible plastics material and having bottom, side, and end walls and being open at the top, and an upper, outer part made of a harder transparent plastics material and comprising top, side, and end walls and being open at the bottom, said parts being so relatively dimensioned that the lower part is received frictionally in the upper part and remains closed without special locking or detent means, said lower part having an ear located as an extension of the bottom wall at one end, the side walls of the upper part being cut away to provide finger grip access to the lower part, said lower part having holding tabs integrally molded on the inside and so shaped with an undercut shape as to receive the elongated article with a snap fit in order to hold the same in the lower part, the flexibility of the bottom part being such that it may be bent in a direction away from its open face in order thereby to release the article from the aforesaid holding tabs.

3. A protective case for a medical thermometer, said case comprising an elongated trough-like lower inner part made of a soft flexible plastics material and having bottom, side, and end walls, said part being open at the top and being so dimensioned as to provide substantial clearance space around the thermometer to be carried thereby, and an upper, outer part made of a plastics material and comprising top, side, and end walls and being open at the bottom, said parts being so relatively dimensioned that the lower part is received frictionally in the upper part and remains closed without special locking or detent means, said lower part having an ear located as an extension of the bottom wall at one end, said lower part having holding tabs integrally molded on the inside and so shaped with an undercut shape as to receive the thermometer with a snap fit in order to hold the same in the lower part, the flexibility of the bottom part being such that it may be bent in a direction away from its open face in order thereby to release the thermometer from the aforesaid holding tabs.

4. A protective case for a medical thermometer, said case comprising an elongated trough-like lower inner part made of a soft flexible plastics material and having bottom, side, and end walls, said part being open at the top and being so dimensioned as to provide substantial clearance space around the thermometer to be carried thereby, and an upper, outer part made of a harder transparent plastics material and comprising top, side, and end walls and being open at the bottom, said parts being so relatively dimensioned that the lower part is received frictionally in the upper part and remains closed without special locking or detent means, said lower part having an ear located as an extension of the bottom wall at one end, the end wall of the upper part being cut away to clear said ear, the side walls of the upper part being cut away to provide finger grip access to the lower part, said lower part having holding tabs integrally molded on the inside and so shaped with an undercut shape as to receive the thermometer with a snap fit in order to hold the same in the lower part, the flexibility of the bottom part being such that it may be bent in a direction away from its open face in order thereby to release the thermometer from the aforesaid holding tabs and to expose one end of the thermometer for ready removal.

5. A protective case for a medical thermometer, said case comprising an elongated trough-like lower inner part made of a soft flexible polyethylene plastics material and having bottom, side, and end walls, said part being open at the top and being so dimensioned as to provide substantial clearance space around the thermometer to be carried thereby, and an upper, outer part made of a harder transparent plastics material and comprising top, side, and end walls and being open at the bottom, all of said side walls being substantially parallel and all of said end walls being substantialy parallel, whereby said upper part is slidable over said lower part, said parts being so relatively dimensioned and the materials being so related that the lower part is received frictionally in the upper part and remains closed without special locking or detent means, said lower part having an ear located as an extension of the bottom wall at one end, the end wall of the upper part being cut away to clear said ear, the flexibility of the bottom part being such that it may be bent in a direction away from its open face in order thereby to release the thermometer from the aforesaid holding tabs.

6. A protective case for a medical thermometer, said case comprising an elongated trough-like lower inner part made of a soft flexible plastics material and having bottom, side, and end walls, said part being open at the top and being so dimensioned as to provide substantial clearance space around the thermometer to be carried thereby, and an upper, outer part made of a harder transparent plastics material and comprising top, side, and end walls and being open at the bottom, said parts being so relatively dimensioned that the lower part is received frictionally in the upper part and remains closed without special locking or detent means, said lower part having an ear located as an extension of the bottom wall at one end, the end wall of the upper part being cut away to clear said ear, the side walls of the upper part being cut away to provide finger grip access to the lower part, said lower part having holding tabs integrally molded on the inside and so shaped with an undercut shape as to receive the thermometer with a snap fit in order to hold the same in the lower part, the flexibility of the bottom part being such that it may be bent in a direction away from its open face in order thereby to release the thermometer from the aforesaid holding tabs and to expose one end of the thermometer for ready removal.

7. A protective case for a single medical thermometer, said case comprising an elongated trough-like lower inner part made of a soft flexible polyethylene plastics material and having a bottom, two side and two end walls, said part being open at the top and being so dimensioned as to provide substantial clearance space around the thermometer to be carried thereby, and an upper, outer part made of a harder transparent plastics material and comprising a top, two side and two end walls and being open at the bottom, all of said side walls being substantially parallel and all of said end walls being substantially parallel, whereby said upper part is telescopically slidable over said lower part in a direction perpendicular to said top and bottom walls, said parts being so relatively dimensioned and the materials being so related that the lower part is received frictionally in the upper part and remains closed without special locking or detent means, the upper and lower parts being so relatively shaped that an end portion of the lower part is exposed for seizure even when the case is closed, the flexibility of the lower part being such that when said exposed portion of the lower part is seized it may be bent in a direction away from its open face in order to thereby expose one end of the thermometer for ready removal.

References Cited in the file of this patent
UNITED STATES PATENTS

| | | |
|---|---|---|
| 759,588 | Baird | May 10, 1904 |
| 1,698,377 | Stonebraker | Jan. 8, 1929 |
| 2,560,376 | Waterman | July 10, 1951 |
| 2,844,244 | Hanson | July 22, 1958 |

FOREIGN PATENTS

| | | |
|---|---|---|
| 1,024,588 | France | Apr. 2, 1953 |
| 1,083,351 | France | Jan. 7, 1955 |